United States Patent [19]

Shimano

[11] 4,424,048
[45] Jan. 3, 1984

[54] FRONT DERAILLEUR FOR A BICYCLE HAVING HORIZONTALLY POSITIONED LINKAGE MEMBERS

[75] Inventor: Keizo Shimano, Sakai, Japan

[73] Assignee: Shimano Industrial Company Limited, Osaka, Japan

[21] Appl. No.: 269,611

[22] Filed: Jun. 2, 1981

[30] Foreign Application Priority Data

Jun. 17, 1980 [JP] Japan .............................. 55-84977[U]
Sep. 24, 1980 [JP] Japan ............................ 55-136298[U]
Sep. 24, 1980 [JP] Japan ............................ 55-136299[U]

[51] Int. Cl.³ .............................................. F16H 7/22
[52] U.S. Cl. .................................................. 474/82
[58] Field of Search .................... 474/82, 80; 280/236, 280/238

[56] References Cited

U.S. PATENT DOCUMENTS 4,279,605 7/1982 Egami ................................ 474/82

OTHER PUBLICATIONS

Sun Tour Derailleurs, (Rear Derailleur, Cycle Goods Corp., Minnetonka, MN., p. 152, front cover of handbook and inside page of front cover).

Primary Examiner—John E. Murtagh
Assistant Examiner—Andrew Joseph Rudy
Attorney, Agent, or Firm—Stevens, Davis, Miller & Mosher

[57] ABSTRACT

A front derailleur for a bicycle has a base member provided with a horizontal mount and a pair of linkage members disposed longitudinally of the bicycle and extending horizontally, the linkage members being mounted on the mount swingably through first and second pivot shafts extending vertically, so that an air resistance against the linkage members is reduced during the bicycle's running, and a smooth speed can be obtained.

9 Claims, 17 Drawing Figures

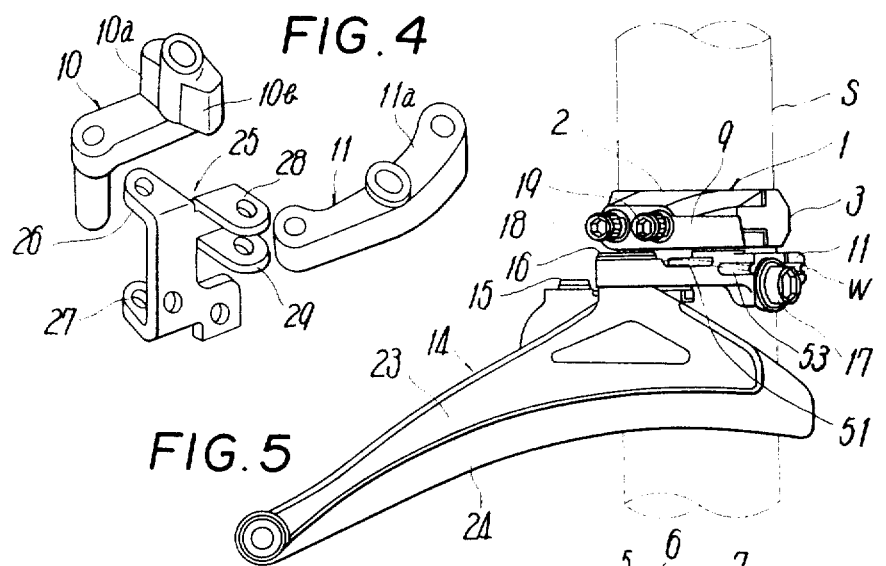
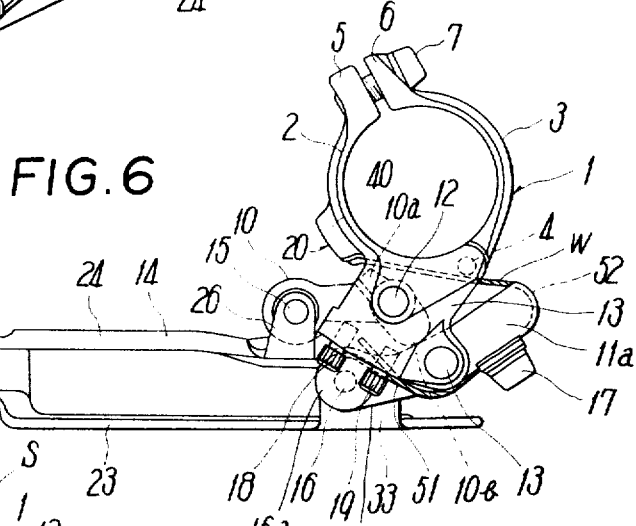
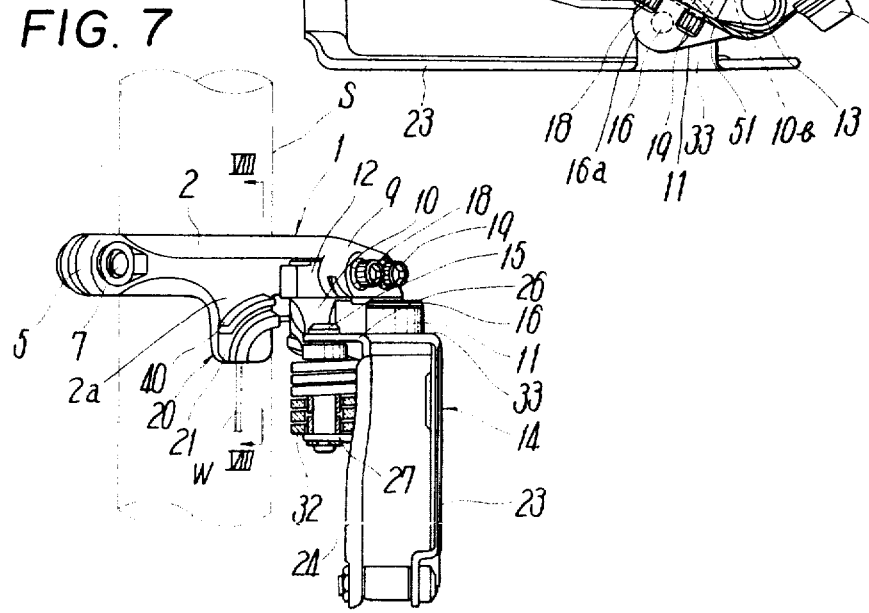

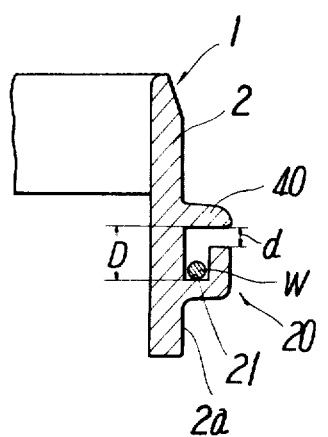
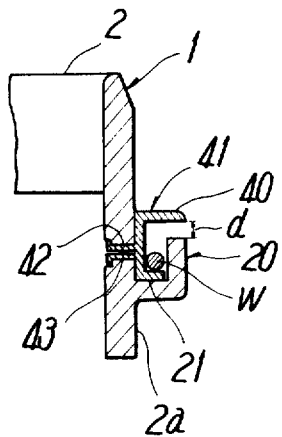
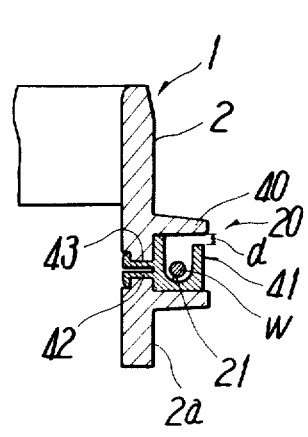
FIG.8    FIG.9    FIG.10
FIG.11
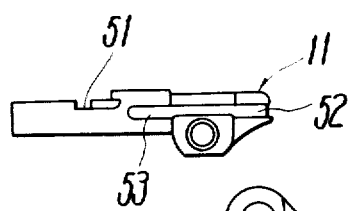
FIG.12
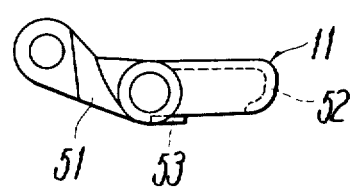
FIG.13
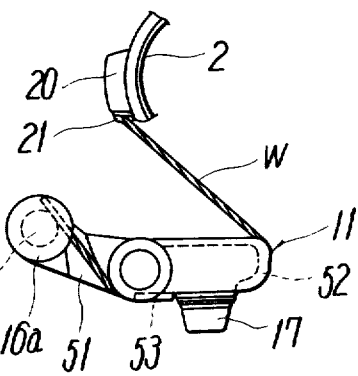
FIG.14
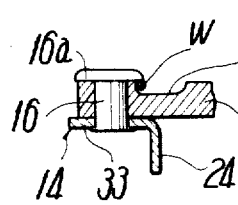
FIG.15
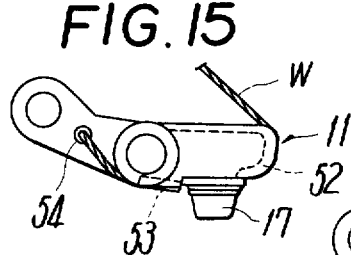
FIG.16
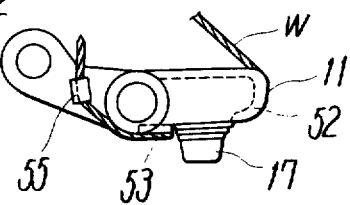
FIG.17

FRONT DERAILLEUR FOR A BICYCLE HAVING HORIZONTALLY POSITIONED LINKAGE MEMBERS

FIELD OF THE INVENTION

This invention relates to a front derailleur for a bicycle, and more particularly to a front derailleur mounted on a seat tube of a bicycle and used to switch a driving chain to a desired one of a plurality of front chain gears through operation of a control wire.

BACKGROUND OF THE INVENTION

Generally, a front derailleur comprises a base member fixed to the seat tube, a pair of linkage members pivoted swingably to the base member, and a chain guide pivoted to the linkage members. A control wire is operated to move the chain guide axially of the front chain gears, thereby switching the driving chain to a desired front chain gear.

The front derailleur heretofore proposed has the linkage members disposed substantially vertically, pivoted at the upper ends thereof swingably to the base member through horizontal shafts, and pivotally supporting at the lower ends the chain guide through horizontal shafts, the linkage members swinging around the horizontal shafts mounted on the base member to move the chain guide axially of the chain gears.

When the front derailleur is mounted on the seat tube, the linkage members are directed substantially vertically along the seat tube, so that their projected areas longitudinal of the bicycle are large which induces an air resistance against the linkage members during the bicycle's running.

In order to reduce the air resistance, the projected area may be reduced by employing a smaller sectional area for each linkage member, but the linkage members are subjected to a significant force when switching the chain, so that the sectional area can only be reduced a certain amount in order to retain the structural strength.

On the other hand, in the conventional front derailleur having the linkage members vertically arranged, the chain, when switched from a smaller diameter chain gear to a larger diameter one, is pressed against the lateral side thereof because the chain guide swings around the horizontal shafts axially of the chain gears, thereby creating a problem of causing an unsmooth switching of the chain.

Furthermore, the linkage members, which are vertically arranged along the seat tube, enlarge a distance between the base member and the chain guide, so that the front derailleur as a whole has a large size and increased weight.

SUMMARY OF THE INVENTION

An object of the invention is to provide a front derailleur for a bicycle which can reduce an air resistance against the linkage members at the front derailleur during the bicycle's running while maintaining their strength, switch a driving chain smoothly from a smaller diameter front chain gear to a larger diameter one, and be small-sized as a whole.

The front derailleur of the invention, which supports a chain guide through a pair of linkage members to a base member fixed to a seat tube of the bicycle, is characterized in that the base member is provided with a mount extending horizontally, and the linkage members are pivoted swingably to the mount through vertical shafts and disposed horizontally so that the lengthwise center line of each linkage member is kept horizontal when the base member is mounted on the seat tube.

Accordingly, the linkage members arranged in this manner can, without having reduced sectional areas, considerably reduce the projected areas longitudinal of the bicycle in comparison with conventional linkage members, and reduce an air resistance against them during the bicycle's running while keeping their strength.

Also, the chain guide, when the chain is switched from a smaller diameter to a larger diameter one, can move in the chain shifting direction to reach a position corresponding to the larger chain gear, thereby smoothly switching the chain.

Furthermore, the horizontally disposed linkage members allow for a reduction in the distance between the chain guide and the base member, thereby making the front derailleur small-sized and lightweight as a whole.

These and other objects, features and advantages of the invention will become more apparent upon a reading of the following detailed description and drawings, in which:

BRIEF DESCRIPTION OF THE DRAWINGS

FIG. 4 is a perspective view of parts of the front derailleur,

FIG. 5 is a side view of a modified embodiment of the invention,

FIG. 6 is a plan view of the FIG. 5 embodiment,

FIG. 7 is a rear view thereof,

FIG. 8 is a partially enlarged sectional view taken on the line VIII—VIII in FIG. 7, FIGS. 9 and 10 are partially enlarged sectional views of other modified embodiments of a wire guide, corresponding to FIG. 8.

FIG. 11 is a front view of a second linkage member only,

FIG. 12 is a plan view thereof,

FIG. 13 is a view explanatory showing the fixing of a control wire and retaining a free end thereof, FIG. 14 is a sectional view of the principal retaining portion in FIG. 13, FIGS. 15 and 16 show retaining means for a free end of the control wire, and FIG. 17 is an enlarged sectional view of the principal portion of the retaining means in FIG. 16.

DETAILED DESCRIPTION OF THE INVENTION

Figure 1:
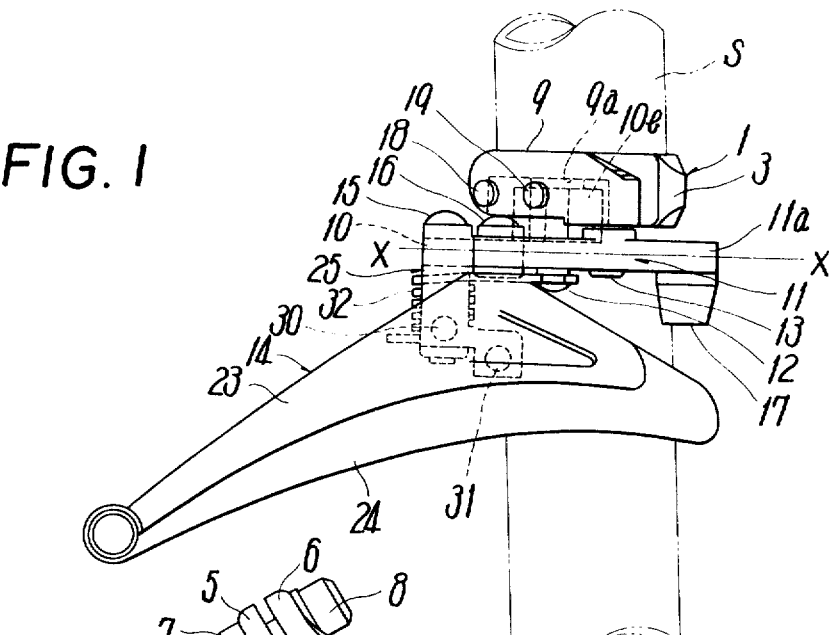
FIG. 1 is a side view of an embodiment of a front derailleur of the invention.

Referring to FIG. 1, a front derailleur of the invention is mounted on a seat tube S of a bicycle tightening band base member 1.

Figure 2:
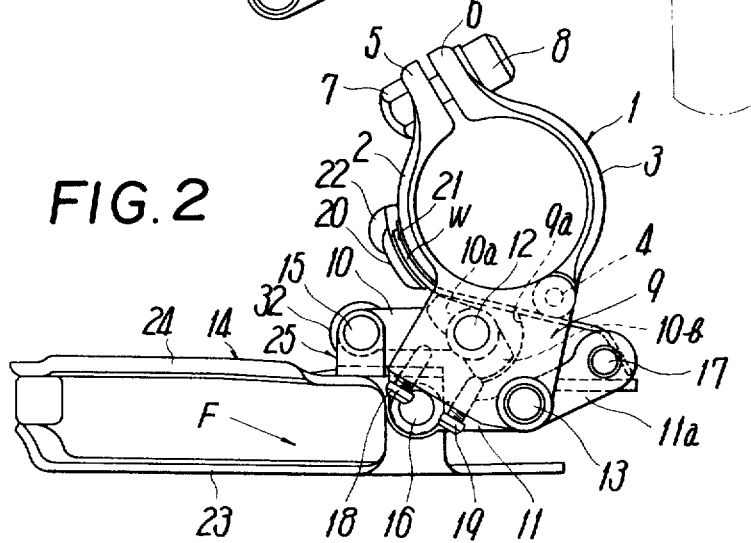
FIG. 2 is a plan view of the FIG. 1 embodiment.

The base member 1, as shown in FIG. 2, comprises a pair of half-circular bands 2 and 3 which are pivotally connected at their one ends through a pivot pin 4 and are provided at their other ends with noses 5 and 6. The noses 5 and 6 are screwably tightened by a bolt 7 and a nut 8, thereby fixing base member 1 to seat tube S.

Also, the base member 1 has at one half-circular band 2 a mount 9 extending radially outwardly and horizontally with respect to seat tube S.

A pair of first and second linkage members 10 and 11 are disposed below the mount 9 and extend horizontally and longitudinally of the bicycle with respect to seat tube S. The linkage members 10 and 11 are pivoted at the front ends thereof swingably to mount 9 through first and second pivot shafts 12 and 13 having substantially vertical axes, and pivotally carry at the rear ends a chain guide 14 through third and fourth pivot shafts 15 and 16 having substantially vertical axes respectively.

When base member 1 is fixed to seat tube S, a lengthwise center line of the respective linkage members 10 and 11 becomes horizontal as shown in FIG. 1. As a result, linkage members 10 and 11 are smaller in their projected areas longitudinal of the bicycle than conventional linkage members which are vertically arranged.

The first and second linkage members 10 and 11, as shown in FIG. 2, are disposed in parallel to each other and inside and outside with respect to seat tube S. The first linkage member 10 disposed inside is provided at the front end with stoppers 10a and 10b as shown in FIG. 4. The second linkage member 11 disposed outside is provided at the front end with an arm 11a extending frontward from the pivot point of pivot shaft 13 as shown in FIG. 4, the arm 11a carrying a fixture 17 for a control wire W.

The mount 9 has, at a side supporting first linkage member 10, a recess 9a receiving therein stoppers 10a and 10b and, at the laterally outer surface, two adjusters 18 and 19 to contact with stoppers 10a and 10b corresponding to swinging motion of respective linkage members 10 and 11, the adjusters 18 and 19 controlling a range of swinging motion of first and second linkage members 10 and 11.

Figure 3:
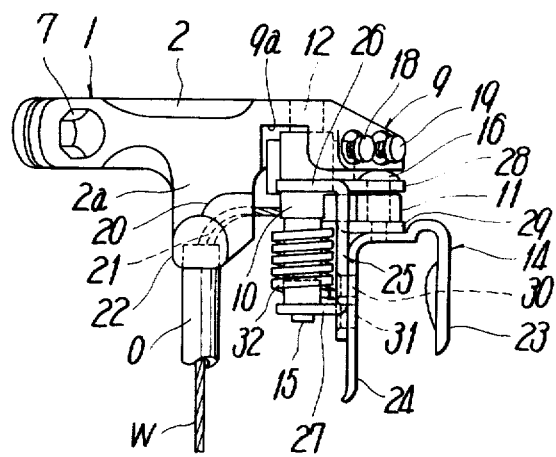
FIG. 3 is a rear view thereof.

The band 2 having mount 9, as shown in FIG. 3, is provided with an extension 2a which extends downwardly and has a wire guide 20 having a guide groove 21 for guiding control wire W to fixture 17.

The guide groove 21, as shown in FIGS. 2 and 3, is open upwardly and provided at the lower end with a stop 22 for securing an outer sheath O guiding control wire W.

The wire W extends from a control lever (not shown), is guided by outer sheath O, passes through guide groove 21 at wire guide 20 to reach fixture 17, and is fixed thereto. The wire W, when pulled, forcibly swings linkage members 10 and 11 and, when loosened, elastically returns them through a return spring to be hereinafter described.

The chain guide 14 has a pair of opposite guide plates 23 and 24 and is supported to linkage members 10 and 11 through a mounting member 25. The mounting member 25, as shown in FIG. 4, is provided with a pair of mounting noses 26 and 27 projecting inwardly with respect to seat tube S and a pair of mounting noses 28 and 29 projecting outwardly with respect to the same, the mounting noses 26, 27, 28 and 29 each having a shaft bore, so that the rear end of linkage member 10 is inserted between noses 26 and 27, and that of linkage member 11 between the noses 28 and 29, both the rear ends being supported by third and fourth pivot shafts 15 and 16 respectively. The chain guide 14 is fixed to mounting member 25 by pins 30 and 31.

A return spring 32 is interposed between the chain guide 14 and the first linkage member 10 and biases chain guide 14 to be kept stationary at a position corresponding to the smaller diameter chain gear, i.e., at the so-called low normal condition, the chain guide 14 moving in the direction of the arrow F in FIG. 2 to switch the chain from the smaller diameter chain gear to the larger diameter chain gear.

When the front derailleur of the invention constructed as just described is fixed to seat tube S, the linkage members 10 and 11 are disposed horizontally and directed longitudinally of the bicycle with respect to seat tube S. Hence, the smaller projected areas of linkage members 10 and 11 longitudinal of the bicycle can considerably reduce an air resistance against linkage members 10 and 11 and base member 1.

When the chain is switched from the smaller diameter chain gear to the larger diameter one, the control lever is operated to pull control wire W to swing the second linkage member 11 together with the first linkage member 10 counterclockwise in FIG. 2, so that chain guide 14 shifts in the direction of the chain movement (the direction of the arrow F in FIG. 2) to reach the position corresponding to the larger diameter chain gear. Consequently the chain is not forcibly pressed against the inside surface of the larger diameter gear, thereby smoothly engaging with the teeth thereof.

When the chain is reswitched to the smaller diameter gear, control wire W is loosened and return spring 32 acts to return chain guide 14 to the position corresponding to the smaller diameter chain gear. In this instance, the chain is smoothly switched to the smaller diameter chain gear in the same manner as a conventional front derailleur.

The outer sheath O used in the aforesaid embodiment is not inevitably necessary. In the case where no outer sheath O is used, wire W is pulled against return spring 32 or loosened, and linkage members 10 and 11 swing to reciprocate chain guide 14 axially of the chain gears to switch the chain to a desired chain gear. In this instance, wire W, when loosened, shakes outwardly with respect to guide groove 21 and may escape therefrom. A remedy for the above is that guide groove 21, as shown in FIGS. 5 through 7, has a depth D (FIG. 8) in the shaking direction of the loosened wire W which covers a shaking width of wire W, and a barrier wall 40 is provided at the open side of guide groove 21, i.e., at the wire W outwardly shaking side, covering groove 21, so that between the barrier wall 40 and the upper edge of wire guide 20 is formed a gap d of width smaller than a diameter of wire W and guide groove 21 is open substantially perpendicularly to the shaking direction of wire W.

In the above discussion of the shaking direction and shaking width of wire W it is meant the direction and width of shaking wire W when loosened by the control lever operation.

Since the wire guide 20 is constructed as the above, wire W, even when shaking within guide groove 21, is not hindered from moving by operation of the control lever and, even when shaking excessively, is prevented by barrier wall 40 from escaping from guide groove 21.

The embodiment shown in FIGS. 5 to 7 uses no outer sheath O but only the control wire W and is provided with barrier wall 40 integral with base member 1 as shown in FIG. 8.

The barrier wall 40 may alternatively be formed at an insert 41 made from synthetic resin and separate from base member 1 as shown in FIG. 9, the insert 41 being inserted in guide groove 21.

In this instance, the insert 41 is U-like shaped in section to cover the bottom of guide groove 21, thus guiding the wire W more smoothly.

Alternatively, an insert 41 of synthetic resin like that shown in FIG. 9 may be interposed within guide groove 21 shown in FIG. 8. Or, the insert 41, as shown in FIG. 10, may be formed in an upwardly open U-like shape in section and inserted in guide groove 21 to thereby guide the wire W through the bottom of insert 41.

The above inserts 41 each are provided with a projection 42 having a slit, and the base member 1 has a stepped through bore 43, the projection 42 being inserted into through bore 43 to fix insert 41.

In the above described embodiment, a free end of wire W secured to fixture 17 projects from the second linkage member 11 and is dangerous to the cyclist. Such danger can be eliminated by the provision of a retaining means which retains the free end to the second linkage member 11.

Such a retaining means is shown in FIG. 6 and comprises a wire groove 51 formed on the upper surface of the second linkage member 11 and directed from the outside thereof with respect to seat tube 1 to the inside as shown in FIGS. 11 and 12.

The retaining means in FIG. 6 comprises a first wire guide groove 52 and a second wire guide groove 53 as shown in FIGS. 11 and 12, the first wire guide groove 52 guiding wire W to fixture 17, the second wire guide groove 53 guiding the projecting free end of wire W from fixture 17 to wire groove 51, so that wire W is guided at its end into wire groove 51 and retained to the wall thereof by means of the elasticity of wire W.

It is preferred that wire groove 51, as shown in FIG. 13, extend toward the fourth pivot shaft 16 which pivots chain guide 14, that the pivot shaft 16 have a head 16a which partially overlaps with wire groove 51, and that the free end of wire W retained to the wall of wire groove 51 is inserted below the head 16a, thereby preventing the free end of wire W from rising.

In the above construction, the free end of wire W secured to fixture 17 is bent at an end of the second wire guide groove 53 and given an elastically restoring force and then guided into wire groove 51, thereby being retained at the wall of groove 51 and held by head 16a. Hence, the free end of wire W is surely retained to linkage member 11 from outside thereof to inside thereby avoiding a careless escape or external exposure when in use with the front derailleur.

In the embodiment shown in FIGS. 5 to 7, chain guide 14, intead of using mounting member 25, is provided at the inner guide plate 24 with mounting noses 26 and 27, so that the first linkage member 10 is inserted between the mounting noses 26 and 27 and supported by the third pivot shaft 15. A connector 33 bridges guide plates 23 and 24 and is supported to the second linkage member 11 by the fourth pivot shaft 16.

Alternatively, the retaining means may comprise a through bore 54 provided at linkage member 11, as shown in FIG. 15, or a projection 55 of an inverted L-like shape provided at the same, as shown in FIGS. 16 and 17. The projection 55 may be molded integrally with linkage member 11 or cut and raised from a metallic plate formed in linkage member 11.

While preferred embodiments of the invention have been described using specific terms, such description is for illustrative purpose only, and it is to be understood that changes and variations may be made without departing from the spirit or scope of the invention which is defined in the following claims.

What is claimed is:

1. A front derailleur which is mounted on a seat tube of a bicycle for switching a driving chain to one of a plurality of front chain gears by operation of a control wire, said front derailleur comprising:
    a base member fixed to said seat tube and having a mount which extends radially outwardly and horizontally with respect to said seat tube;
    first and second pivot shafts supported to said mount at said base member and having their axes extending substantially vertically respectively;
    a pair of linkage members disposed longitudinally of said bicycle with respect to said seat tube and extending horizontally and pivoted at the front portions thereof swingably to said mount through said first and second pivot shafts respectively;
    third and fourth pivot shafts supported to the rear portions of said linkage member and having their axes extending substantially vertically respectively; and,
    a chain guide pivoted swingably to the rear portions of said linkage members through said third and fourth pivot shafts.

2. A front derailleur for a bicycle according to claim 10, wherein one of said linkage members has an arm extending forwardly from the pivot point of said second pivot shaft, said arm mounting a fixture for a control wire.

3. A front derailleur for a bicycle according to claim 2, wherein said base member is provided with a wire guide having a guide groove through which said control wire is guided to said fixture.

4. A front derailleur for a bicycle according to claim 3, wherein said guide groove is open upwardly and has above the open side a barrier wall for preventing said wire guided through said guide groove from escaping therefrom, so that between said barrier wall and the upper end of said wire guide is provided a gap of a width larger than a diameter of said wire.

5. A front derailleur for a bicycle according to claim 2, wherein said linkage member carrying said fixture for said control wire is provided with a retaining means for retaining a free end of said wire secured to said fixture.

6. A front derailleur for a bicycle according to claim 5, wherein said retaining means comprises a wire groove formed on the upper surface of said linkage member and extending from the outside of said linkage member with respect to said seat tube to the inside thereof.

7. A front derailleur for a bicycle according to claim 6, wherein said wire groove extends toward said fourth pivot shaft pivotally supporting said linkage member, said fourth pivot shaft has a head large enough to partially overlap with said wire groove, and the free end of said wire retained to said wire groove enters inside of the head of said fourth pivot shaft, so that said wire is prevented from rising.

8. A front derailleur for a bicycle according to claim 5, wherein said retaining means comprises a through bore formed at said linkage member.

9. A front derailleur for a bicycle according to claim 5, wherein said retaining means comprises a projection having an inverted L-like shape.

* * * * *